(12) United States Patent
Boucadair et al.

(10) Patent No.: US 10,965,520 B2
(45) Date of Patent: Mar. 30, 2021

(54) METHOD OF CONTROLLING A RESIDENTIAL GATEWAY FROM A COMMUNICATION NETWORK, METHOD OF SUPERVISION, METHOD OF EXECUTING AN ACTION, CORRESPONDING DEVICES AND COMPUTER PROGRAM

(71) Applicant: Orange, Paris (FR)

(72) Inventors: Mohamed Boucadair, Betton (FR);
David Binet, La Chapelle Thourault (FR); Christian Jacquenet, Pont-Pean (FR)

(73) Assignee: Orange, Paris (FR)

( * ) Notice: Subject to any disclaimer, the term of this patent is extended or adjusted under 35 U.S.C. 154(b) by 96 days.

(21) Appl. No.: 16/098,424

(22) PCT Filed: May 2, 2017

(86) PCT No.: PCT/FR2017/051048
§ 371 (c)(1),
(2) Date: Apr. 8, 2019

(87) PCT Pub. No.: WO2017/191407
PCT Pub. Date: Nov. 9, 2017

(65) Prior Publication Data
US 2019/0273651 A1     Sep. 5, 2019

(30) Foreign Application Priority Data

May 2, 2016   (FR) .................................. 1653933

(51) Int. Cl.
*H04L 12/24*     (2006.01)
*H04L 12/28*     (2006.01)
*H04L 12/66*     (2006.01)

(52) U.S. Cl.
CPC ........ *H04L 41/0672* (2013.01); *H04L 12/283* (2013.01); *H04L 12/2818* (2013.01);
(Continued)

(58) Field of Classification Search
CPC . H04L 41/0671; H04L 12/2898; H04L 12/66; H04L 12/2818; H04L 12/2825; H04L 12/283
See application file for complete search history.

(56) References Cited

U.S. PATENT DOCUMENTS

2007/0242601 A1   10/2007  Gbadegesin et al.
2014/0010541 A1*   1/2014  Diab ....................... H04L 12/12
                                                    398/66
(Continued)

FOREIGN PATENT DOCUMENTS

EP    2413533        2/2012
EP    2552084        1/2013
KR    20050078547    8/2005

OTHER PUBLICATIONS

Nishihara, Susumu et al, "Power-saving methods with guarantee service interoperability in Ethernet passive optical networks", IEEE Communications Magazine, vol. 50, No. 9, Sep. 2012, pp. 110-117.
(Continued)

*Primary Examiner* — Brenda H Pham
(74) *Attorney, Agent, or Firm* — Knobbe, Martens, Olson and Bear, LLP

(57) ABSTRACT

The disclosed technology relates to a method of rebooting a residential gateway. In one aspect, the residential gateway is connected, on the one hand, to a wide-area communications network and, on the other hand, to a local-area network in which the gateway implements the method in a consecutive order of:
  receiving a first action message comprising at least one order to shut down the gateway, the first action message
(Continued)

being generated by an execution entity of the wide-area communications network and transmitted on the data link layer;

storing a context of configuration of the local-area network associated with the gateway;

shutting down the gateway; and rebooting the gateway according to the context of configuration previously stored.

16 Claims, 4 Drawing Sheets

(52) U.S. Cl.
CPC ...... *H04L 12/2825* (2013.01); *H04L 12/2898* (2013.01); *H04L 12/66* (2013.01)

(56) References Cited

U.S. PATENT DOCUMENTS

2014/0270773 A1* 9/2014 Elmoalem ............... H04L 63/06
398/66
2014/0359149 A1 12/2014 Morrissey et al.

OTHER PUBLICATIONS

International Search Report dated Jul. 3, 2017 for International Application No. PCT/FR2017/051048 filed May 2, 2017.

* cited by examiner

METHOD OF CONTROLLING A RESIDENTIAL GATEWAY FROM A COMMUNICATION NETWORK, METHOD OF SUPERVISION, METHOD OF EXECUTING AN ACTION, CORRESPONDING DEVICES AND COMPUTER PROGRAM

This application claims foreign priority to French Application FR 1653933, filed on May 2, 2016, which is incorporated herein by reference in its entirety.

TECHNOLOGICAL FIELD

The disclosed technology relates to the field of communications within a communications network having a gateway.

More specifically, the disclosed technology offers a solution to remotely control at least one residential gateway of a communications network to shut it down, make it idle, reboot it, update it, etc.

The disclosed technology is therefore applicable to any communications network connected to at least one residential (home or corporate) gateway.

DESCRIPTION OF THE RELATED TECHNOLOGY

The IP (Internet Protocol) network is the universal medium of a multitude services and applications.

To access these services or applications, a residential gateway, also called a box, an HG (home gateway) or a CPE (customer premises equipment) is classically installed in a user's premises. In other words, a residential gateway serves as an interface between the user's local-area network and an operator's IP network. It is therefore the concentrating element through which there travel all the connections and the characteristic traffic of the different services subscribed to by the user, and which further supports a set of applications provided by the telecommunications operator.

For example, a residential gateway enables the user to access IP "multi-services" enabling simultaneous access to the Internet, access to video contents (including television programs) and access to conversation services (telephony on IP).

The installation and the management of the residential gateway, for access to Internet access services as well as to telephony and television services in particular, are conventionally performed by the user since the residential gateway is installed at the user's premises.

Now, users do not always have the necessary qualifications or ability to take action on the residential gateway in order to configure certain parameters for disconnecting the gateway in case of weather events such as storms and then reboot the equipment after an incident, an updating etc.

In addition, unlike equipment deployed by telecommunications operators in their transportation networks, these residential gateways installed on users' premises are not assisted in the event of problems. In other words, there is no mechanism of assistance to maintain the continuity of the services subscribed to by a user should a residential gateway undergo dysfunctioning (for example electrical breakdown or power outage).

Such a state of unavailability thus makes access to the services unavailable, with unfortunate consequences not only for the user (for example inability to use the telephony service to send out emergency calls or to call upon the operators' technical services to report a failure on the line) but also for the operator (for example with an overload of calls to technical services, overload on the network if the electrical breakdown impacts large numbers of users, etc.).

There is therefore a need for a novel technique to control a residential gateway at a distance.

SUMMARY OF CERTAIN INVENTIVE ASPECTS

The disclosed technology therefore relates, according to a first aspect, to various methods.

It thus relates, firstly, to a method of restarting or rebooting a residential gateway connected firstly to a wide-area communications network and secondly to a local-area network, in which the gateway implements the following:

receiving a first action message comprising at least one order to shut down the gateway, the first action message being generated by an execution entity of the wide-area communications network and transmitted on the data link layer;

storage of a context of configuration of the local-area network associated with the gateway;

shutting down the gateway; and rebooting the gateway according to the context of configuration previously stored.

It may be recalled that the context of configuration of a residential gateway is associated with the services provided by the gateway to the devices connected to this gateway.

Through these devices, the wide-area communications network can remotely control at least one residential gateway in transmitting action messages to it through the data link layer (layer 2 of the OSI model).

It is especially possible for the wide-area network to control the residential gateway by using Ethernet frames, especially when there do not exist or no longer exist any IP connection between the execution entity and the gateway (for example when it is not possible or no longer possible to communicate with the gateway through the IP layer). The MAC (Medium Access Control) address can thus be used to unambiguously identify a residential gateway and therefore use only the resources of the data link layer to exchange information with the residential gateway.

Here, residential gateways are deemed to be integrated into the supervision sequence, thus ensuring continuity of service when events of different types cause deterioration in the services subscribed to by a customer/user or make them unavailable. Thus, through the activation of this technique, the service or services are always provided to the user even in the event of failure of the residential gateway.

In addition, the wide-area network can act remotely on a residential gateway in a way that is completely transparent to the user, i.e. especially in averting a situation where he is required to take action himself on the gateway. This technique thus implements independent behavior such as to preserve continuity of service in the event of a failure of the gateway. Thus, the levels of quality and availability of the services subscribed to by the users, and as perceived by the users, are improved.

The proposed solution further reduces the demands made on the technical services of the operator/service provider since the operator can take direct action on the gateway of its customer/user. Thus, the costs associated with the operator's technical services are diminished.

It further optimizes the operator's costs in preventing the sources of failure that may require hardware replacement.

According to particular characteristics, the gateway further implements the reception of an order for rebooting the gateway, transmitted in the first action message or in a second action message generated by the execution entity and transmitted on the data link layer.

Through these arrangements, the re-booting order could, like the shut-down order, be received by the gateway even when there does not exist or no longer exists any IP connection between the execution entity and the gateway.

These different actions can be carried out immediately or in a delayed or deferred manner.

This is why, according to other particular characteristics, the first and/or second action message comprises at least one time-related indicator for executing the shut-down order and/or the reboot order.

Indeed, several variants can be envisaged:
immediate or deferred shut-down order;
immediate shut-down and reboot order;
immediate shut-down and deferred reboot order; and
deferred shut-down and reboot order.

For example, it is possible to program the shutting down of a residential gateway at an instant t and then the rebooting of the gateway at an instant (t+1) to minimize the risk of degradation/deterioration in the event of violent storms occurring between the instants t and (t+1).

According to yet other particular characteristics, the gateway further implements the transmission, to the execution entity or to a supervision device of the wide-area communications network, of the context of configuration of the local-area network.

Through these arrangements, the context of configuration could be used by the supervision device in order to offer a user a continuity of service if a breakdown of communications between the residential gateway and a user terminal is detected and thus to preserve the user's level of satisfaction.

For example, this context of configuration could be duplicated and activated at an emergency or back-up access point or hotspot during the breakdown. In particular, a local-area network device (for example a terminal, an "internal" residential gateway) can use the identifier of a local connection to the network through the at least one residential gateway to get connected to the network via the back-up access point. This identifier can especially be an SSID (Service Set Identifier). No modification of the local terminals is required.

According to yet other particular characteristics, the gateway implements the transmission, to the execution entity, of an announcement message indicating the action or actions that can be executed by the gateway, the announcement message being transmitted during the linking of the gateway to the wide-area communications network and/or periodically and/or in response to a discovery message transmitted by the execution entity.

According to yet other particular characteristics, the gateway furthermore carries out a a recording of configuration information for the gateway and transmits the configuration information to the execution entity or to a supervision device of the wide-area communications network.

Using this configuration information, a user can, for example indicate his wish to receive an SMS before the rebooting of the residential gateway, configure time slots during which an updating and a rebooting of the gateway can be executed, indicate a wish to give permission before an action is undertaken or subscribe to a continuity of service offer.

The disclosed technology thus relates secondly to a method of controlling the rebooting of a residential gateway connected on the one hand to a wide-area communications network and, on the other hand, to a local-area network, the method being implemented in an execution entity of the wide-area communications network, wherein the execution entity implements the following:
generating a first action message comprising at least one order for shutting down the gateway;
transmitting the first action message to the gateway, the first action message being transmitted on the data link layer; and
transmitting an order for rebooting the gateway.

Through these arrangements, the wide-area network can shut down and effect the rebooting of a residential gateway in a manner that is completely transparent for the user, i.e. so as to avoid calling upon him to take action himself on his gateway.

According to particular characteristics, the reboot order is transmitted by the execution entity either in the first action message or in a second action message generated by the execution entity and transmitted on the data link layer.

According to other particular characteristics, generating a first action message comprises:
receiving at least one command message coming from a supervision device of the wide-area communications network comprising the shut-down order, possibly the reboot order and at least one configuration parameter; and
generating the first action message in taking account of the shut-down order, possibly the reboot order and the at least one configuration parameter.

According to even more particular characteristics, the at least one configuration parameter belongs to the group comprising:
an identifier of the gateway;
a security token;
a time-related indicator of execution of the shut-down order; and
an activation of the sending of a report to the supervision device after execution of the shut-down order.

According to other particular characteristics, the execution entity implements a preliminary verification of the capacity of the gateway to execute an action ordered by the execution entity, the verification comprising the transmission of a discovery message interrogating the gateway on its capacities, and the reception of an announcement message indicating the actions that can be executed by the gateway.

The disclosed technology further relates, thirdly, to a method of supervising the rebooting of a residential gateway connected on the one hand to a wide-area communications network and on the other hand to a local-area network, in which a supervision device of the wide-area communications network implements the following:
obtaining information on the gateway;
deciding to shut down the gateway; and
transmitting, to an execution entity of the wide-area communications network, at least one command message comprising an order for shutting down the gateway, possibly an order for rebooting the gateway and at least one configuration parameter.

Through these arrangements, the wide-area network detects a malfunctioning of a residential gateway and decides to undertake a type of action where the gateway is shut down and then rebooted in order to resolve the problem.

According to particular characteristics, the supervision device implements the following, prior to the shutting down of the gateway:

receiving a context of configuration of the local-area network associated with the gateway; and duplicating and activating the context of configuration at a back-up access point.

Through these arrangements, it is possible to ensure continuity of service through a back-up access point during the unavailability of the gateway.

According to an even more particular characteristics, a device of the local-area network uses the identifier of the gateway in the local-area network to get connected to the wide-area communications network via the back-up access point.

According to a second aspect, the disclosed technology relates to a variety of devices.

It thus relates firstly to a residential gateway connected on the one hand to a wide-area communications network and on the other hand to a local-area network, the gateway comprising a processor operationally coupled with a memory, and configured to:

receive a first action message comprising at least one order to shut down the gateway, the first action message being generated by an execution entity of the wide-area communications network and transmitted on the data link layer;

store, in the memory, a context of configuration of the local-area network associated with the gateway;

shut down the gateway; and reboot the gateway according to the context of configuration previously stored.

Such a residential gateway is especially suited to implementing the method of rebooting as described here above. Thus, such a gateway could comprise the following different characteristics, pertaining to the rebooting method according to the disclosed technology, that can be combined or taken in isolation. The components for receiving an action message and for executing the action implement for example at least one processor and one memory.

The disclosed technology further relates, secondly, to an execution entity of a wide-area communications network configured to control the rebooting of a residential gateway connected on the one hand to the wide-area communications network and, on the other hand, to a local-area network, the execution entity comprising a processor operationally coupled with a memory and configured to:

generate a first action message comprising at least one order to shut down the gateway;

transmit the first action message to the gateway, the first action message being transmitted on the data link layer; and transmit a reboot order for rebooting the gateway.

Such an execution entity is especially adapted to implementing the method of control described here above. Thus, such an entity could comprise the different characteristics of the method of control according to the disclosed technology that can be combined or taken in isolation. In particular, such an execution entity can be hosted in a telephone central office. It can especially comprise physical and/or software components. The components for generating and transmitting the action message implement for example at least one processor and one memory.

According to particular characteristics, the rebooting order is transmitted by the execution entity either in the first action message or in a second action message generated by the execution entity and transmitted on the data link layer.

The disclosed technology further relates, thirdly, to a supervision device of a wide-area communications network configured to supervise the rebooting of a residential gateway connected on the one hand to the wide-area communications network and, on the other hand, to a local-area network, the supervision device comprising a processor coupled operationally to a memory, and being configured to:

obtain information on the gateway;

take a decision to shut down the gateway; and transmit, to an execution entity of the wide-area communications network, at least one command message comprising an order to shut down the gateway, possibly a rebooting order to reboot the gateway, and at least one configuration parameter.

Such a supervision device is especially adapted to implementing the method of supervision described here above. Thus, such a device could comprise the different characteristics of the method of supervision according to the disclosed technology that can be combined or taken in isolation. In particular, such a supervision device can be of the CSC (Customer Support Center) type. The information-obtaining, decision and transmission components implement, for example, at least one processor and one memory.

Such a supervision device can especially interface with customer incident or network incident management hubs or platforms to detect a malfunction involving a residential gateway or decide to undertake action to resolve these incidents.

It will be noted that, in one particular embodiment, the supervision device and the execution entity can be hosted by the same equipment.

The advantages of these devices are essentially the same as those of the methods briefly explained here above.

According to one embodiment, the disclosed technology relates to one or more computer programs comprising instructions to implement at least one method as described here above, when this program or these programs are executed by a processor.

According to another embodiment, the disclosed technology relates to one or more non-detachable or partially or totally detachable information carriers readable by a computer and comprising instructions of one or more computer programs for the execution of at least one method as described here above.

The methods according to the disclosed technology can be implemented in various ways, especially in wired form and/or in software form.

BRIEF DESCRIPTION OF THE DRAWINGS

Other features and advantages of the disclosed technology shall appear more clearly from the following description of one particular embodiment, given by way of a simple, illustratory and non-exhaustive example and from the appended drawings of which.

DETAILED DESCRIPTION OF CERTAIN ILLUSTRATIVE EMBODIMENTS

The general principle of the disclosed technology relies on the sending, by a communications network execution entity, of at least one action message intended for one or more residential gateways (home and/or corporate gateways) of the communications network, so that the gateway or gateways can be controlled remotely by the network.

In particular, the action message is transmitted at the data link level and has, for example, its destination as a MAC address of a residential gateway, enabling control of the gateway itself in the event of a loss of IP connectivity of the gateway (for example a failure in allocation of IP address to the gateway).

The disclosed technology therefore offers a solution for an automated management of the residential gateways, i.e. management that does not require action by the user, and is integrally driven and negotiated by the operator through his network.

In this way, according to at least one embodiment of the disclosed technology, the different gateways connected to a communications network can be rebooted upon instruction transmitted by the network, without action by the user, while, at the same time, the continuity of the services subscribed to by a user is maintained during the incident.

Different actions can be undertaken remotely.

For example, the automatic rebooting of the residential gateways simplifies the processing of the incidents without action by the user. The programming of a deferred start makes it possible to put a residential gateway out of service for the duration of the events likely to affect its operation, such as storms, and thus prevent any hardware deterioration in the gateways or in the customer's electrical installation. The network operator can thus command gateways so that they are put out of service automatically if certain events are observed or even scheduled or anticipated.

It can be noted, that according to one particular embodiment of the disclosed technology, user preferences can be configured so that the actions are executed at the level of the residential gateway in taking account of constraints and requirements of the users. It can further be envisaged that the gateways will have default configurations of these preferences, capable to allowing or rejecting actions requested by the network.

Figure 1:
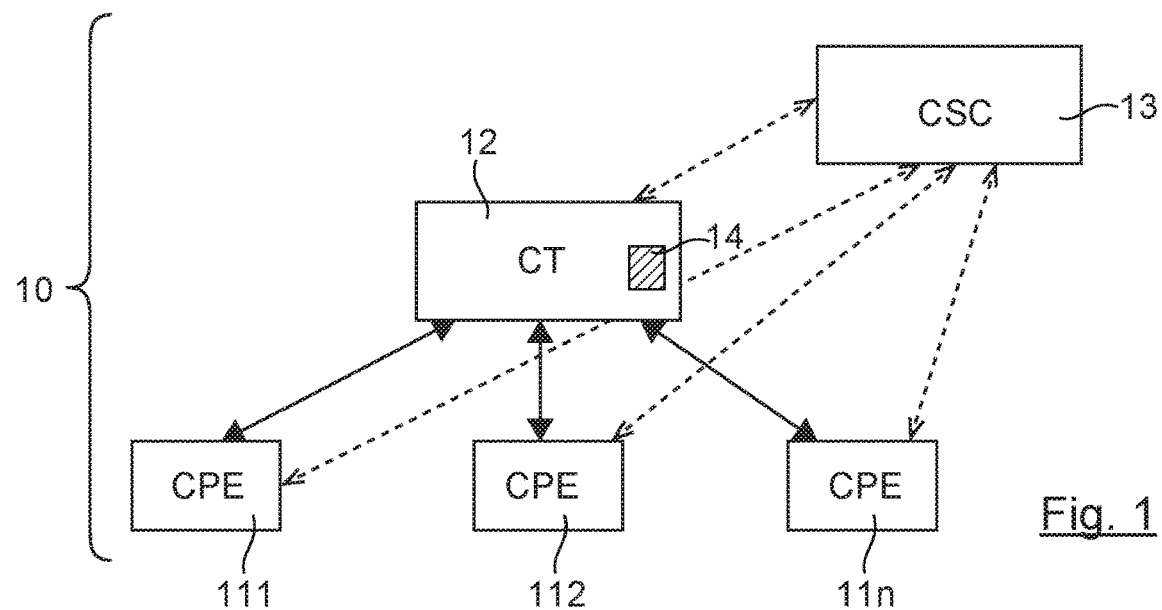
FIG. 1 presents an example of a communications network in which the disclosed technology can be implemented.

By way of an example, referring to FIG. 1, we present a communications network 10 in which the disclosed technology can be implemented.

A network 10 is considered. This network 10 comprises for example three residential gateways denoted as CPE (111, 112 and 11*n*). These gateways are connected to an apparatus hosted in a telephone central office CT 12 and enable access to the Internet. The telephone central office feeds the connection lines to the gateways according to instructions provided by a management hub or platform of the operator, for example a supervision device (or center) (CSC) for the residential gateways 13. These instructions can be configured preliminarily (i.e. the telephone central office 12 does not need to contact the supervision device 13 to take decisions), retrieved on request, etc. As the case may be, the telephone central office 12 and the supervision device 13 are co-located.

For example, if we consider an Optical Distribution Network (ODN), the connection lines to the gateways are optical fibers connected to a termination equipment of the optical line termination (OLT) type. Other Internet access technologies can naturally be envisaged in the context of the disclosed technology (for example ADSL, 3G, 4G, 5G, WLAN etc.).

The disclosed technology is therefore not limited by the technology or technologies of access used by the residential gateway or gateways, by functions supported by the residential gateway or gateways, by the nature and/or the number of services accessible through the residential gateway or gateways, etc.

Figure 2:
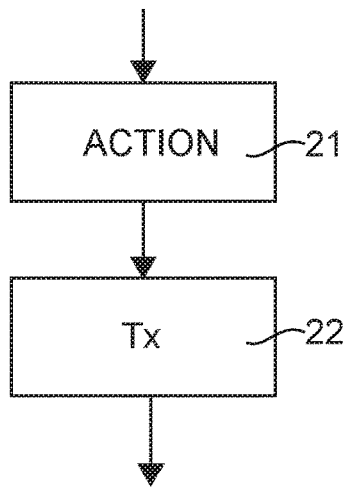
FIGS. 2, 3 and 4 illustrate a method of controlling residential gateways, a method of executing at least one action, and a method of supervision, respectively.

FIG. 2 illustrates a method implemented by an execution entity according to the disclosed technology, to control at least one residential gateway. Such an execution entity, referenced 14 with reference to FIG. 1, can be hosted in a telephone central office 12 (i.e. an existing piece of equipment of the telephone central office, for example an OLT, or in an apparatus dedicated to the execution of functions of the execution entity).

Initially, the execution entity 14 of the communications network generates (21) an action message describing at least one action to be performed by at least one residential gateway CPE (111, 112, 11*n*).

The execution entity 14 then transmits (22) this action message to the residential gateway or gateways CPE (111, 112, 11*n*) on the data link level immediately or in a deferred manner.

Figure 3:
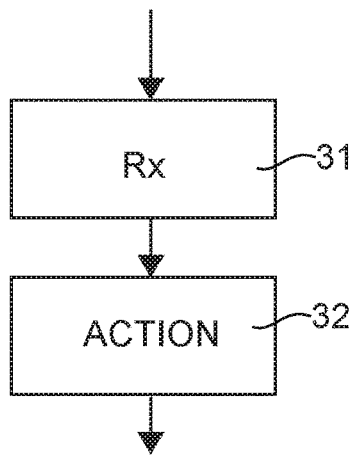

FIG. 3 illustrates a method implemented by the residential gateway according to the disclosed technology to execute the action or actions commanded by the execution entity 14.

Initially, a gateway CPE 112 for example receives (31) the action message sent out by the execution entity 14.

Subsequently, it executes (32) this action immediately or in a deferred manner according to the configuration parameters of the action message.

It can be noted that the decision to undertake an action at a residential gateway can be taken by the execution entity 14, for example in taking account of the preliminary configurations. Thus, a rebooting of a residential gateway can be undertaken upon automatic detection of certain incidents.

Figure 4:
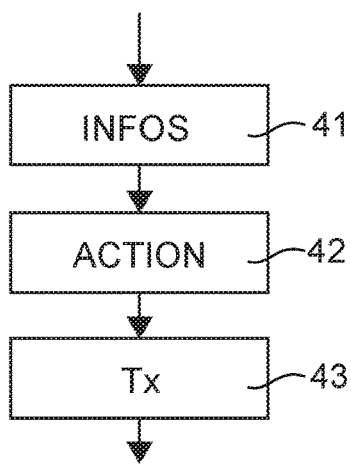

According to another embodiment, the decision to undertake an action at a residential gateway can be taken by the supervision device 13 of the communications network and then transmitted to the execution entity 14. According to this embodiment, a method implemented by the supervision device of the disclosed technology to supervise at least one residential gateway is illustrated in FIG. 4.

Such a device can first of all obtain (41) information on the residential gateways of gateways of the network.

Based on this information, the supervision device 13 decides (42) on at least one action to be performed by at least one residential gateway of the network.

Finally, the supervision device 13 transmits (43) at least one piece of information on the at least one action to the execution entity 14 of the communications network. For example, the supervision device transmits a command message to the execution entity and the execution entity 14 generates an action message upon reception of this command message.

Here below, a more detailed description is provided of an example of implementation of the disclosed technology for the rebooting of a residential gateway CPE 111 of the communications network 10.

As indicated here above, users' preferences can be configured to make the residential gateways execute the actions in taking account of the constraints and requirements of the users. Thus, a operator/service provider can plan for a management interface (for example a services portal) enabling a user to enter information about his preferences.

The user can thus indicate one or more time slots during which the rebooting can be done, if an explicit action is needed before launching the reboot operation (for example the sending of an SMS message to the user in order to warn him about the imminent rebooting of his gateway, etc.). It is thus possible to improve the quality of services in preventing the execution of an action of the type where the gateway is rebooted while the user is viewing a film through his gateway, this execution being prevented unless there is an emergency (a proven risk of natural catastrophe for example).

These preferences can if necessary be configured in the user's residential gateway or during subscription to the service.

Optionally, the residential gateway can be adapted to implementing advanced mechanisms (for example heuristic mechanisms) to assist in decision making for the execution of an action.

To thwart malicious use of the procedure (for example disturbing a line), a phase of mutual authentication may be required between the residential gateway and the execution entity. The use of the data link layer for sending control messages constitutes a first level of security for wired access points because only equipment on the physical path can generate such messages. Other authentication mechanisms can be implemented.

According to a first example, the reboot request is made at the initiative of the execution entity 14. The execution entity 14 then generates an action message describing at least one action to be performed by the residential gateway.

According to a second example, the reboot request is made at the initiative of the supervision device 13, following events reported back to the supervision device 13. If necessary, this information is correlated with other sources of information such as calls to technical services.

It may be recalled that, classically, one or more supervision centers or devices (CSC or customer support centers) can be deployed in an operator's network. Such CSC devices are responsible for dealing with incidents on the connection lines of the residential gateways to the network. A CSC supervision device therefore has access to information on the physical topology and distribution characteristics of the network. Access to this information can be direct or it can go through mediation platforms. A CSC supervision device can be responsible for managing a group of lines, different segments of the network depending on the organization chosen by the operator etc. A CSC supervision device further has access to disturbance information that impacts on the efficient operation of certain user lines. Thus, it can receive explicit instructions to start an immediate or deferred rebooting action for a residential gateway or a group of residential gateways. An action that may be conducted in a deferred manner according to the instructions communicated by a supervision device CSC can lead to a programming of a residential gateway for a deferred rebooting or a programming of an execution entity. The deferred rebooting can be advantageously used by an operator to prevent an overload of the network if the rebooting of a large number of residential gateways is necessary (for example in the context of a programmed updating of major software versions having an impact on all the residential gateways of a same region).

The decision to reboot a residential gateway can be local to a CSC supervision device or be external to it (for example it can be an administrative decision, an action resulting from a call to an after-sales service, claims or complaints by users, etc.). The decision can further be taken by the execution entity in certain conditions.

When the rebooting decision is taken by the supervision device 13, this device calls upon the telephone central office or offices 12 (more specifically the execution entities 14 hosted by these central offices) to inform them of a reboot management action to be undertaken. The method is carried out by the sending of an "ACTION (Type, Parameters)" type command message from the supervision device to the execution entity. One or more command messages ACTION( ) can be sent.

The arguments of the command ACTION( ) indicate especially:
  the nature of the action; and
  a list of configuration parameters or objects ("Information Elements" (IE)).

Such configuration parameters belong for example to the group comprising: a residential gateway identifier (for example a line identifier (LINE_ID) or a user identifier (SUBSCRIBER_ID)), a security token (TOKEN), a time-related indicator for execution of an action (for example a reboot activation date (START_TIMER)), the activation of the sending of a report to the CSC supervision device after execution of the action (REPORT_SET), etc.

Different actions can be undertaken by the CSC supervision device, for example:
  Type=0: de-program a rebooting action planned for a residential gateway or a group of residential gateways;
  Type=1: trigger a reboot action for a residential gateway or a group of residential gateways. This same action is used to update policies already communicated to the CSC for a given residential gateway (for example a deferred rebooting operation, a periodic rebooting operation etc.). It may be noted that different types can be defined. Using a same type or distinct types is part of a choice of implementation:
  Type=2: retrieve a report of the reboot action for a residential gateway or a group of residential gateways.

Naturally, other actions can be defined, such as the updating of an instruction already communicated to the execution entity etc.

Upon reception of the "ACTION (Type, Parameters)" type command message, the execution entity 14 can generate one or more action messages describing at least one action to be performed by the residential gateway.

To this end, according to one example of implementation, the execution entity 14 implements a verification of the command message "ACTION (Type, Parameters)" received.

If the execution entity is not compatible with the command messages "ACTION( )", the command message is not taken into account but the execution entity can memorize the reception of the message in a log file in the same way as it can memorize all the events related to the providing of the service.

If the execution entity is compatible with the command messages "ACTION( )", but if the reboot function is not available locally, it sends an error message to the supervision device, for example of the ERROR(Code=UNSUPP, . . . ) type.

If the execution entity is compatible with the command messages "ACTION( )", but cannot decode the command message (for example because fields are missing or non-authorized, or because there is a problem of alignment of the message etc.), it sends an error message to the supervision device, for example of the type ERROR (Code=MALFORMED, . . . ).

If the execution entity is compatible with the command messages "ACTION( )", but not with the type of action described in the command message, it sends an error message to the supervision device, for example of the type ERROR(Code=UNSUPP_TYPE, . . . ).

If the execution entity is compatible with the type of action contained in the command message "ACTION( )", but the obligatory information for this type of action is missing, it sends an error message to the supervision device for example of the type ERROR (Code=MALFORMED_TYPE, . . . ).

It can be noted that other items of information can be included in the error message.

Once the command message ACTION 0 has been validated by the execution entity, this execution entity extracts the type of action as well as the associated configuration parameters.

If the command message specifies a configuration parameter of the time-related indicator or timer type for immediate execution of the action (i.e. a value of a parameter START_TIMER equal to "0"), then the execution entity executes the action immediately. An action message is then transmitted to the residential gateway.

Else, if the command message comprises a configuration parameter of type where the time-related indicator indicates deferred execution of the action (i.e. the value of START_TIMER is different from "0"), the action can be programmed at the due date indicated in START_TIMER. In other words, the execution entity transmits, to the residential gateway, an action message possibly at the due date START_TIMER. The action can be launched before the due date.

According to one particular embodiment, prior to the dispatch of the action message describing at least one action to be performed by the residential gateway, the execution entity may verify the capacity of the residential gateway to execute the action.

For example, if the action consists in launching the rebooting of a residential gateway, the execution entity may identify the residential gateway or the concerned line and verify that the remote residential gateway supports the rebooting mechanism driven by the network.

This piece of information can be configured preliminarily, discovered during the linking of the residential gateway to the network or again retrieved on request.

Figure 5:
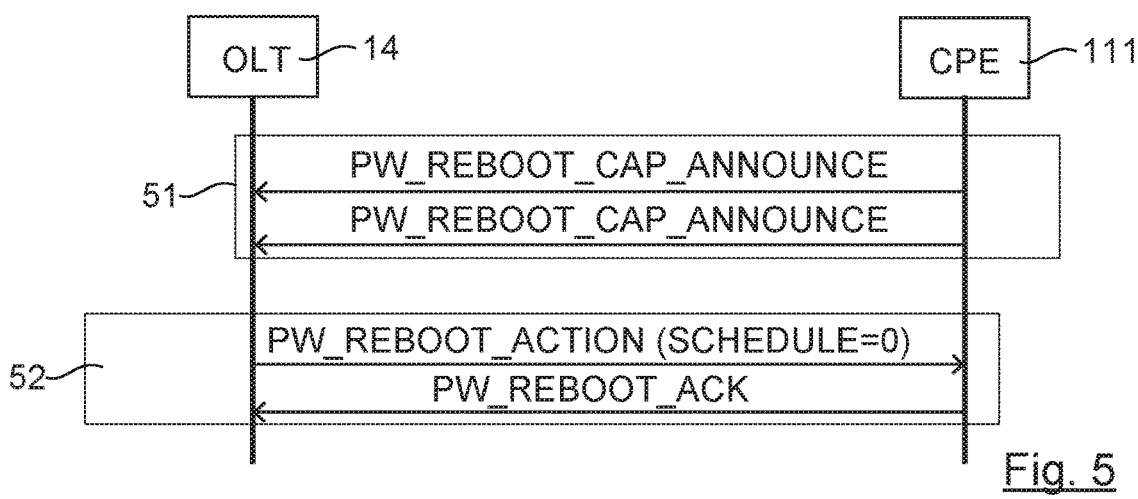

FIG. 5 illustrates an example of exchanges between the residential gateway 111 and the execution entity 14, hosted by an OLT for example, in implementing the discovery of the capacities of the residential gateway periodically or during the linking of the gateway to the network. According to this example, during an action 51, the residential gateway 111 sends out at least once the announcement message PW_REBOOT_CAP_ANNOUNCE( ) either when it is connected to the network or at a regular frequency. This message states whether the residential gateway is compatible with the reboot procedure driven by the network. The execution entity 14 stores the information in a dedicated file. This file can be fed directly by the OLT (in the case of an optical network) that has received the message PW_REBOOT_CAP_ANNOUNCE for the other functional entities of the distribution chain. It can be noted that an announcement message can be generated for each possible action on the residential gateway (rebooting, shutting down, making it idle etc.). The announcement message can further indicate any other action that can be executed by the residential gateway (PW_ACTION_CAP_ANNOUNCE).

Figure 6:
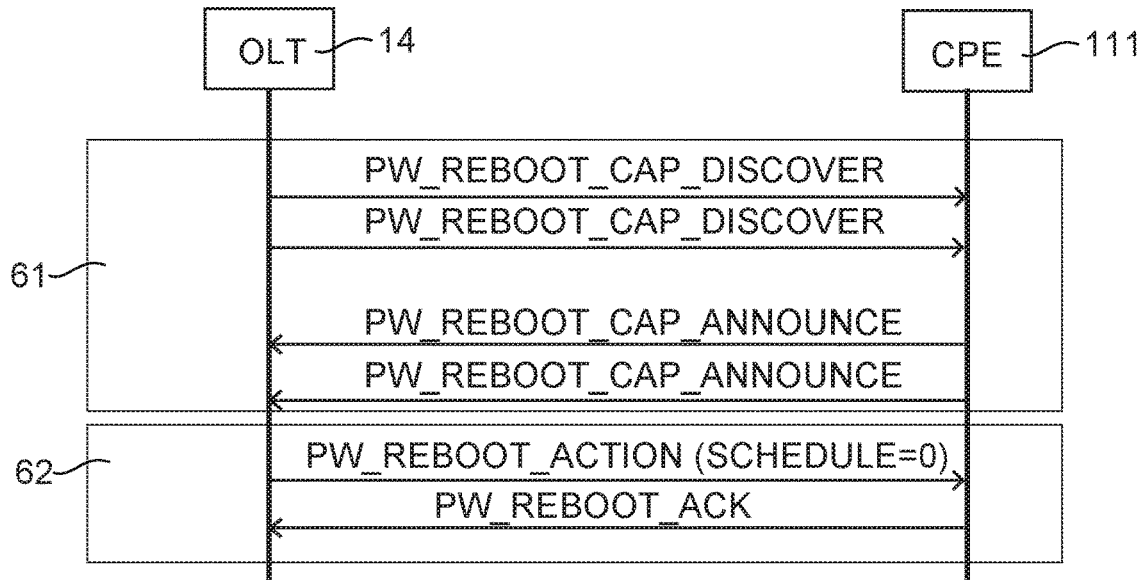
FIGS. 5, 6, 8 and 9 illustrate examples of exchanges of messages between an execution entity and a residential gateway.

FIG. 6 illustrates an example of exchanges between the residential gateway 111 and the execution entity 14, implementing retrieval for the capacities of the residential gateway at request, if the action consists in launching the rebooting of a residential gateway. According to this example, during an action 61, the execution entity 14 sends out a discovery message (via an OLT in the case of an optical accessed network, or via other functional entities of the distribution chain), PW_REBOOT_CAP_DISCOVER, intended for a residential gateway or a group of residential gateways.

At reception of the discovery message, the residential gateway 111 responds with an announcement message PW_REBOOT_CAP_ANNOUNCE if it is compatible with the reboot procedure driven by the network; else the message is not taken into account by the residential gateway. The messages PW_REBOOT_CAP_DISCOVER and PW_REBOOT_CAP_ANNOUNCE can be sent several times to prevent the loss of these messages. Again, such messages can be sent to verify the capacity of the residential gateways to execute different actions (rebooting, shutting down, making it idle etc.), in using messages of the PW_ACTION_CAP_DISCOVER and PW_ACTION_CAP_ANNOUNCE type.

The discovery message, more generally of the PW_ACTION_CAP_DISCOVER type, is therefore sent by an execution entity to ask a residential gateway whether it is capable of executing an action driven by the network. Other pieces of information on the functional capacities of a residential gateway can further be requested via this message.

The announcement message, more generally of the PW_ACTION_CAP_ANNOUNCE type is sent to the execution entity by the residential gateway either in response to a discovery message of the PW_REBOOT_CAP_DISCOVER type (explicit request) or unsolicitedly, for example at each network synchronization or at regular intervals.

If the residential gateway 111 is compatible with the action or actions requested by the network, then the execution entity 14 sends the action message describing the action or actions to be performed by the residential gateway. For example, as illustrated in FIGS. 5 and 6, the execution entity 14 generates an action message PW_REBOOT_ACTION to request the residential gateway 111 to carry out a reboot.

This action message, more generally of the PW_ACTION_ACTION type, can be sent by the execution entity to the residential gateway to ask it to undertake an action.

Upon reception of this action message, the residential gateway 111 can acknowledge reception of the action message in sending back an acknowledgement message PW_REBOOT_ACK intended for the execution entity.

Such an acknowledgement message, more generally of the PW_ACTION_ACK type, can be sent by a residential gateway in response to a message received from the network to acknowledge reception of an instruction and inform it that all the associated actions have been performed successfully.

It can be noted that, according to an alternative embodiment, the execution entity re-sends the action message PW_REBOOT_ACTION so long as a stopping condition has not been fulfilled. For example, the execution entity re-sends the action message until reception of an acknowledgement message (PW_REBOOT_ACK) from the residential gateway or until expiry of a dedicated retransmission timer or until a maximum number of messages PW_REBOOT_ACTION has been transmitted or if the line is inactive etc.

According to another variant, it is possible to make the reboot action conditional on a preliminary authorization on the part of the user.

Once the action message is received, the action can be executed by the residential gateway or gateways immediately or in a deferred manner.

To this end, the action message can comprise at least one configuration parameter, for example a time-related indicator of execution of the action. Thus, if the action consists in launching the reboot of a residential gateway, the action message PW_REBOOT_ACTION( ) can comprise a "Schedule" parameter. If the value of this parameter is positioned at "0" (schedule=0), then the rebooting may be immediate (possibly after the sending of the message PW_REBOOT_ACK). If the value of this parameter is positioned at a non-zero value (Schedule=T), then the reboot may be programmed at the due date "Schedule=T".

The sending of the acknowledgement message PW_REBOOT_ACK is a confirmation sent by the gateway to the network according to which the reboot action has been successfully programmed.

If the residential gateway 111 cannot execute the reboot action requested by the network, it sends a failure message to inform the network about it. For example, such a failure message PW_REBOOT_NACK is sent by the residential gateway 111 if it does not comprise any dedicated function to carry out the rebooting (for example a "crond" function) if the execution of the programming request has failed etc.

Such a failure message, more generally of the PW_ACTION_NACK type, can be sent by a residential gateway to a message received from the network, to inform the execution entity, on which the residential gateway depends for execution of the actions, that an error has been encountered during the processing of an action requested by the execution entity.

It can be noted besides that if the residential gateway 111 does not have any IP connectivity, and if a deferred reboot action is requested, the service subscribed to by the user is not accessible so long as the reboot action has not been performed.

According to at least one embodiment, the disclosed technology proposes to offer continuity of service especially in the event of a deferred rebooting.

Figure 7:
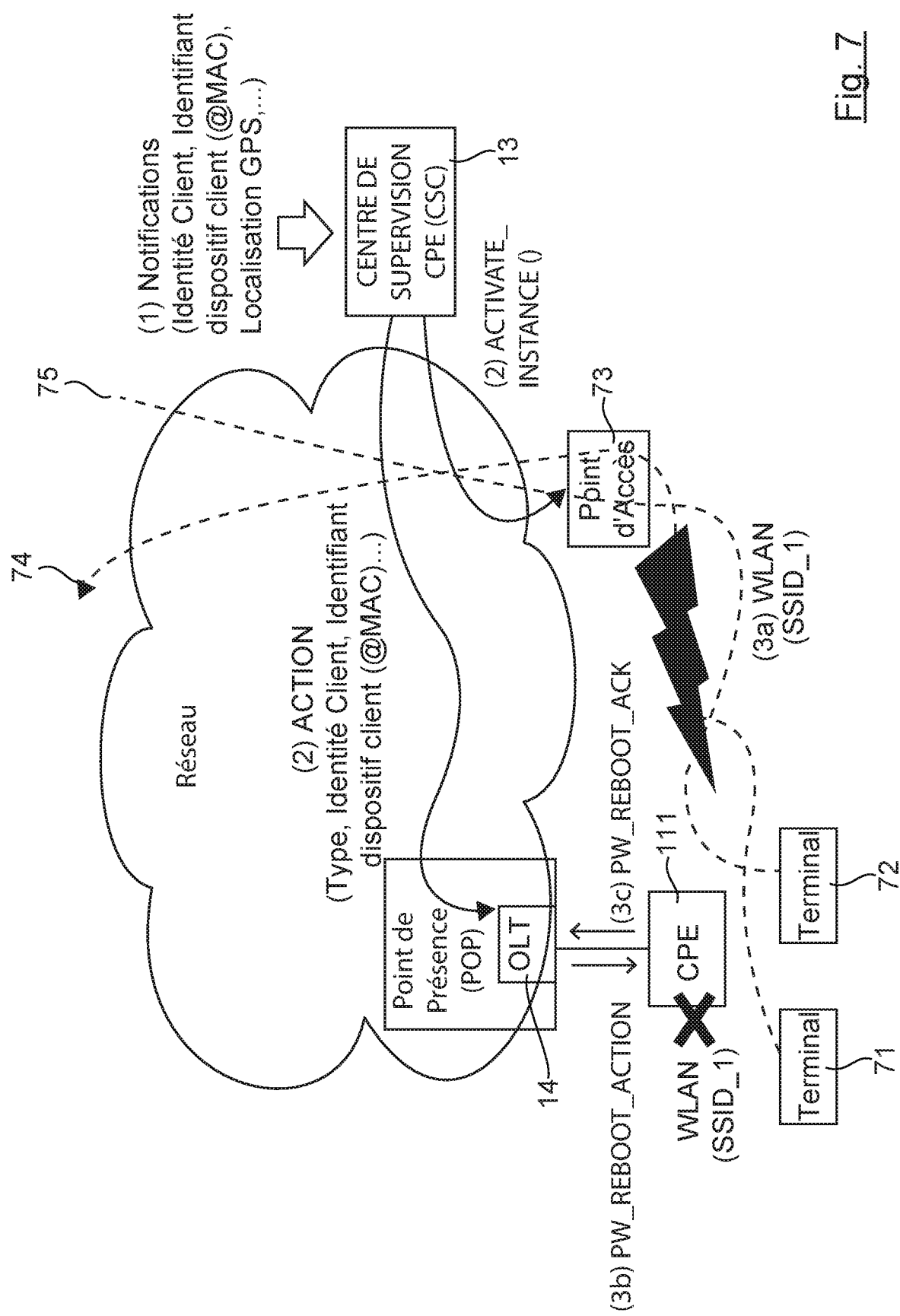
FIG. 7 presents one example of a solution for ensuring continuity of service in the event of unavailability of a residential gateway.

As illustrated in FIG. 7, a user has for example two terminals 71 and 72. He wishes to access the Internet from at least one of his terminals. Now, we can consider the residential gateway CPE 111 to be unavailable or that it will be unavailable in the near future, for example waiting for a reboot operation. The terminals 71 and 72 therefore cannot access the Internet by means of a CPE residential gateway 111.

In order to guarantee continuity of service to the user in this case, the supervision device 13 for supervising the CPEs can obtain, from the CPE residential gateway 111, a context of configuration of the local-area network associated with this residential gateway and then duplicate and activate this context of configuration in a back-up access point 73.

The context of configuration of the local-area network comprises especially the configuration of the wireless local-area network or Wireless LAN (WLAN). As illustrated in FIG. 7, the WLAN identifier SSID_1 of the residential gateway CPE 111 and, if necessary, the user's rules (for example the list of MAC addresses in the case of a MAC filtering application, the static NAT inputs, the filtering rules etc.) are thus duplicated at the back-up access point 73.

This context of network configuration of the residential gateway can be retrieved when rebooting the residential gateway or at request. In an embodiment, the retrieval of the network context can take place preliminarily (i.e. during the nominal operating of a gateway). This context can be updated at the initiative of the gateway, the user or the operator. The retrieval of the context neither assumes nor rules out the observation of an incident. It will be noted that access to this information may meet regulatory requirements on respect for privacy. For example, access to this information exclusively for requirements of continuity of service may be recorded in a contract, or a preliminary authorization on the part of the user can be required etc. The modalities of access and compliance with the confidentiality of this information may also be clearly indicated to the users.

Before launching an action for rebooting the residential gateway 111, the supervision device 13 may have network configuration contexts at its disposal. In order to provide continuity of service, the supervision device 13 may activate the network configuration contexts at a nearby access point 73 (for example a neighboring CPE, WLAN hotspot access point, etc.) by sending it an ACTIVATE_INSTANCE type message.

Once the access point 73 is ready to announce the SSID identifier (for example SSID_1) as the one corresponding to the residential gateway being subjected to a reboot procedure, the reboot procedure can be launched by means of an action message PW_REBOOT_START (sent from the execution entity to the residential gateway 111) and the acknowledgement message PW_REBOOT_ACK.

The lines 74 and 75 shown in dashes illustrate the exchange of traffic between the terminals 71 and 72 and remote machines, via a back-up access point 73 WLAN in the context of continuity of service. According to this technique, a terminal can switch towards a back-up access point when its connecting residential gateway becomes unavailable.

It can be noted that, advantageously, the same security tokens are used for the WLAN association with the back-up access point.

According to one alternative implementation of this technique, an apparatus dedicated to continuity of service is introduced into the user's local-area network. Such a variant can especially be implemented if the retrieval of the network configuration contexts is not compliant with the constraints of the regulations or if it is not suited to an operator (it is for example incomplete or unreliable) or if it is not permitted by a user, etc.

Such a dedicated apparatus, such as a terminal or an internal residential gateway (internal CPE) provides local connectivity between the devices of the local-area network. Thus, the connectivity services such as access to printers, data exchanges between terminals, etc., are ensured.

This variant offers higher level of security because the internal residential gateway can embed functions to authenticate an external access point. Thus, the risks of interception of the traffic by a malicious access point are minimized.

In particular, it can be noted that the functions of the residential gateway and the internal residential gateway can be embedded in the one and the same physical apparatus. However, the management of the supply and the software management (updating for example) in particular should be separated.

A description has been given here above of an example of implementation of the disclosed technology for the execution of a reboot type action (which may be immediate or deferred) on one or more residential gateways.

Here below a description is provided of other examples of implementation of the disclosed technology, capable of being implemented following a reboot action or independently.

For example, the action can be of a "cancel an action" type.

Figure 8:
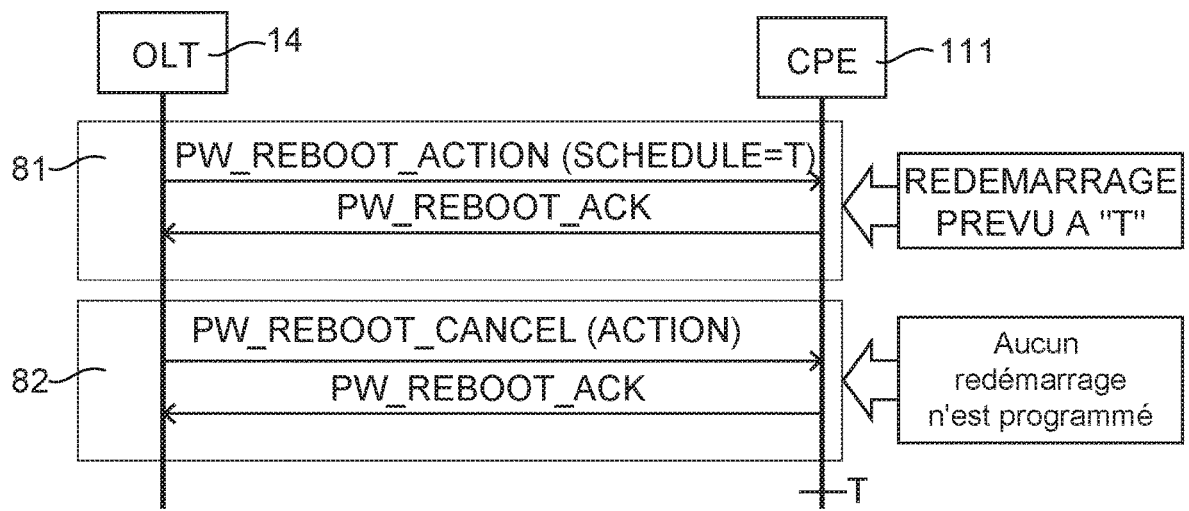

As illustrated in FIG. 8, we consider for example that the execution entity 14 has programmed 81 a reboot cycle, in transmitting a PW_REBOOT_ACTION(Schedule=T) type action message to the residential gateway 111. The residential gateway 111 has acknowledged reception by sending an acknowledgement message PW_REBOOT_ACK.

If this rebooting action should not be performed, the execution entity 14 can erase (82) this reboot cycle by transmitting a cancellation message PW_REBOOT_CANCEL to inform the residential gateway 111 that the reboot action has to be cancelled.

It can be noted that the cancellation message PW_REBOOT_CANCEL can carry a parameter making it possible to identify the action to be eliminated (a copy of action to be eliminated, identifier of action to be eliminated etc.).

The cancellation message PW_REBOOT_CANCEL can further be sent without argument. In this case, all the known deferred actions for rebooting the residential gateway 111 may be cancelled.

An acknowledgement message PW_REBOOT_ACK can then be sent through the residential gateway to inform the network that it has successfully cancelled the programmed reboot actions.

Naturally, any type of action programmed in advance can be eliminated by using a PW_ACTION_CANCEL type message. Thus, such a PW_ACTION_CANCEL type cancellation message can be sent by the execution entity to cancel a programmed action.

The execution entity can further inform one or more residential gateways of a series of actions to be performed.

For example, if a network segment has to be isolated in the event of a natural catastrophe, violent storms, network problems etc., the network can transmit a shut-down instruction to one or more residential gateways as well as a programmed reboot instruction, the execution will not have to take place except at a given due date, for example at the end of the maintenance works programmed in the network).

To this end, a "Boot_Action" parameter of the action message PW_REBOOT_ACTION can be used to notify the residential gateway or gateways about the action to be undertaken.

For example, if the Boot_Action parameter is positioned at "0", then the residential gateway reboots immediately. If the Boot_Action is different from "0", then the residential gateway may first shut down and then reboot at the timeout point indicated by this parameter. This parameter can be included in a PW_REBOOT_ACTION( ) message independently of the value of the "Schedule" parameter.

Figure 9:
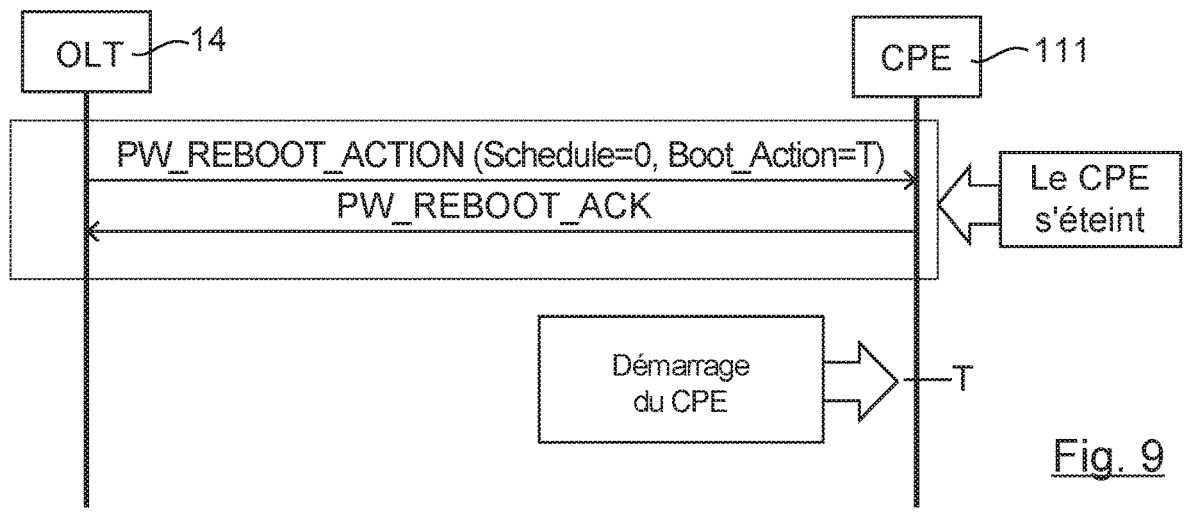

FIG. 9 illustrates an example of the shut-down/rebooting of residential gateway 111 by an execution entity 14. In this example, the execution entity 14 sends an action message of the PW_REBOOT_ACTION type (Schedule=0, Boot_Action=T) to the residential gateway 111. The residential gateway sends an acknowledgement message PW_REBOOT_ACK and then gets shut down. The residential gateway reboots automatically at the due date T.

It can be noted that, according to the disclosed technology, the residential gateways can embed L2 type functions (for example Ethernet packet processing functions) and/or L3 type functions (for example functions of conveying and routing IP traffic, IP address translating functions). Certain functions of the residential gateway can therefore be distributed/offset in the network.

According to a first example, the gateway embeds L3 functions.

According to a second example, the gateway embeds only L2 functions and further includes L3 functions at a distance in the network. The gateway then behaves like a switch. These L3 functions thus virtualized can be hosted within a "cloud" type infrastructure operated by the operator for example. The solutions proposed in the disclosed technology can in this case be profitably used by a user to take action from his home on such virtualized functions. In this variant, the "execution entity" function (hosted (by way of an example) in a telephone central office in the embodiments described here above) is herein hosted within the home network using for example an application installed in an apparatus of the local-area network (mobile telephone, computer etc.).

The solution proposed and described in detail here above in the particular embodiment can be applied equally well to the gateway when this gateway includes only L2 functions. In this case, the gateway is controlled from the operator's network according to the same modalities described here above.

Similarly, the proposed solution can be implemented to control another apparatus of the network connected to the residential gateway. For example, the residential gateway can act as an execution entity to carry out the rebooting of a Set Top Box enabling access to digital television. The residential gateway can thus relay the instructions received from the network for the management of the rebooting of the Set Top Box connected to the residential gateway.

Figure 10:
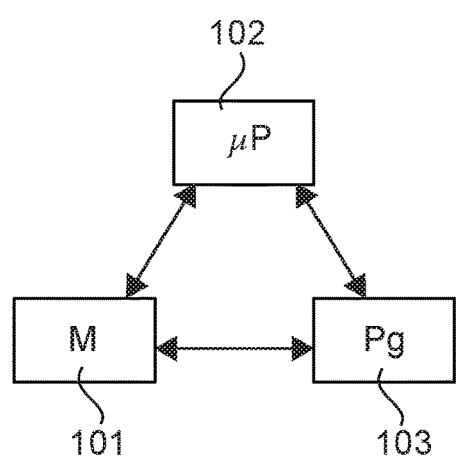
FIG. 10 presents the simplified structure of an execution entity implementing a method of controlling residential gateways according to FIG. 2.

Referring finally to FIG. 10, we present a simplified structure of an execution entity implementing a method of controlling residential gateways according to one of the embodiments described here above.

It can be noted that a similar structure could be envisaged for a residential gateway and for a supervision device.

As illustrated in FIG. 10, an execution entity according to one embodiment of the disclosed technology comprises a memory 101, comprising for example a buffer memory, a processing unit 102 equipped for example with a processor μP and driven by the computer program Pg103, implementing the method of controlling residential gateways described here above.

At initialization, the code instructions of the computer program 103 are for example loaded into a RAM and then executed by the processor of the processing unit 102. The microprocessor of the processing unit 102 implements the method of controlling residential gateways described here above according to the instructions of the computer program 103 to generate an action message comprising at least one action to be performed by the residential gateway and transmits this action message to the gateway via the data link layer.

To this end, the execution entity comprises, in addition to the buffer memory 101, components for generating and transmitting an action message (for example a transmitter).

These components are managed by the microprocessor of the processing unit 102.

The invention claimed is:

1. A method of rebooting a residential gateway connected to a wide-area communications network and to a local-area network, the gateway implementing the method comprising:
   receiving a first action message comprising at least one shut-down order to shut down the gateway, a reboot order, and at least two configuration parameters comprising one time-related indicator for executing the shut-down order and one time-related indicator for executing the reboot order, the first action message being generated by an execution entity of the wide-area communications network upon detection of an incident or a malfunctioning and transmitted on a data link layer;

storing a context of configuration of the local-area network associated with the gateway;

shutting down the gateway at the timeout point indicated by the time-related indicator for executing the shut-down order; and rebooting the gateway according to the context of configuration previously stored at the timeout point indicated by the time-related indicator for executing the reboot order.

2. The method of claim 1, wherein the gateway further implements a transmission, to the execution entity or to a supervision device of the wide-area communications network, of the context of configuration of the local-area network.

3. The method of claim 1, wherein the gateway implements the transmission, to the execution entity, of an announcement message indicating one or more actions that can be executed by the gateway, the announcement message being transmitted during the linking of the gateway to the wide-area communications network and/or periodically and/or in response to a discovery message transmitted by the execution entity.

4. The method of claim 1, wherein the gateway further carries out a recording of a configuration information of the gateway and a transmission of the configuration information to the execution entity or to a supervision device of the wide-area communications network.

5. A method of controlling a rebooting of a residential gateway connected to a wide-area communications network and to a local-area network, the method being implemented in an execution entity of the wide-area communications network, wherein the execution entity implements the method comprising:

upon detection of an incident or a malfunctioning, generating a first action message comprising at least one shut down order for shutting down the gateway, a reboot order, and at least two configuration parameters comprising one time-related indicator for executing the shut-down order and one time-related indicator for executing the reboot order; and transmitting the first action message to the gateway, the first action message being transmitted on a data link layer.

6. The method of claim 5, wherein generating the first action message comprises:

receiving at least one command message coming from a supervision device of the wide-area communications network comprising the shut-down order, the reboot order, and at least two configuration parameters comprising one time-related indicator for executing the shut-down order and one time-related indicator for executing the reboot order; and generating the first action message in response to the shut-down order, the reboot order, and the at least two configuration parameters.

7. The method of claim 6, wherein the at least to configuration parameter are selected from:
an identifier of the gateway;
a security token;

a time-related indicator of execution of the shut-down order;
a time-related indicator for executing the reboot order; and
an activation of a sending of a report to the supervision device after execution of the shut-down order, and/or the reboot order.

8. The method of claim 5, wherein the execution entity implements a preliminary verification of capacities of the gateway to execute an action ordered by the execution entity, the verification comprising a transmission of a discovery message interrogating the gateway on its capacities, and a reception of an announcement message indicating actions that can be executed by the gateway.

9. A method of supervising a rebooting of a residential gateway connected to a wide-area communications network and to a local-area network, wherein a supervision device of the wide-area communications network implements the method comprising:

obtaining information of the gateway, related to an incident or a malfunctioning;

deciding whether or not to shut down and reboot the gateway; and transmitting, to an execution entity of the wide-area communications network, at least one command message comprising a shut down order for shutting down the gateway, reboot order for rebooting the gateway, and at least two configuration parameters comprising one time-related indicator for executing the shut-down order and one time-related indicator for executing the reboot order.

10. The method of claim 9, wherein the supervision device implements the following, prior to shutting down the gateway:

receiving a context of configuration of the local-area network associated with the gateway; and duplicating and activating the context of configuration at a back-up access point.

11. The method of claim 10, wherein a device of the local-area network uses an identifier of the gateway in the local-area network to get connected to the wide-area communications network via the back-up access point.

12. A residential gateway connected to a wide-area communications network and to a local-area network, the gateway comprising a processor operationally coupled to a memory, the processor being configured to:

receive a first action message comprising at least one shut down order to shut down the gateway, a reboot order to reboot the gateway, at least two configuration parameters comprising one time-related indicator for executing the shut-down order and one time-related indicator for executing the reboot order, the first action message being generated by an execution entity of the wide-area communications network and transmitted on a data link layer, upon detection of an incident or a malfunctioning;

store, in the memory, a context of configuration of the local-area network associated with the gateway;

shut down the gateway at the timeout point indicated by the time-related indicator for executing the shut-down order; and reboot the gateway at the timeout point indicated by the time-related indicator for executing the reboot order according to the context of configuration previously stored.

13. An execution entity of a wide-area communications network configured to control a rebooting of a residential gateway connected to the wide-area communications network and to a local-area network, the execution entity comprising a processor operationally coupled to a memory, the processor and memory comprising software being configured to:

upon detection of an incident or a dysfunction, generate a first action message comprising at least one shut down order to shut down the gateway, a reboot order to reboot the gateway, and at least two configuration parameters comprising one time-related indicator for executing the shut-down order and one time-related indicator for executing the reboot order; and transmit the first action message to the gateway, the first action message being transmitted on a data link layer.

14. A supervision device of a wide-area communications network configured to supervise a rebooting of a residential gateway connected to the wide-area communications network and to a local-area network, the supervision device comprising a processor coupled operationally to a memory, the processor and memory comprising software being configured to:

obtain information of the gateway, related to the detection of an incident or malfunctioning;

decide whether or not to shut down the gateway and reboot the gateway; and transmit, to an execution entity of the wide-area communications network, at least one command message comprising a shut down order to shut down the gateway, a reboot order to reboot the gateway, and at least two configuration parameters comprising one time-related indicator for executing the shut-down order and one time-related indicator for executing the reboot order.

15. A non-transitory computer-readable medium comprising a computer program stored thereon comprising program code instructions for implementing a method of rebooting a residential gateway connected to a wide-area communications network and to a local-area network, when said program is executed by a processor of a device, wherein the instructions configure the device to perform at least one iteration of the following acts:

storing a context of configuration of the local-area network associated with the gateway;

shutting down the gateway at a timeout point indicated by a time-related indicator for executing the shut-down; and rebooting the gateway according to the context of configuration previously stored at the timeout point indicated by the time-related indicator for executing the reboot.

16. A non-transitory computer-readable medium comprising a computer program stored thereon comprising a program code instructions for implementing a method of controlling a rebooting of a residential gateway connected to a wide-area communications network and to a local-area network, when said program is executed by a processor of a supervision entity, wherein the instructions configure the supervision entity to perform at least one iteration of the following acts:

upon detection of an incident or a malfunctioning, generating a first action message comprising at least one shut down order for shutting down the gateway, a reboot order and at least two configuration parameters comprising one time-related indicator for executing the shut-down order and one time-related indicator for executing the reboot order; and transmitting the first action message to the gateway, the first action message being transmitted on a data link layer.

* * * * *